March 21, 1939.    N. C. BEESE    2,151,496
LUMINESCENT DISCHARGE LAMP AND COATING THEREFOR
Filed July 22, 1937
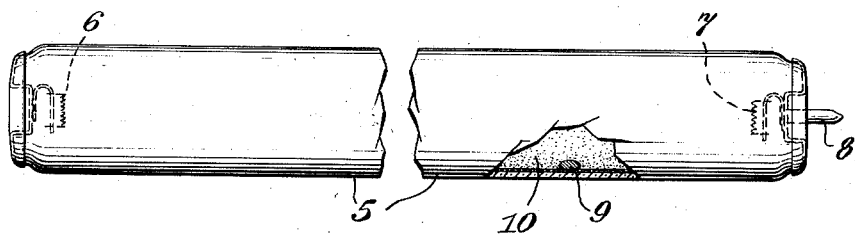
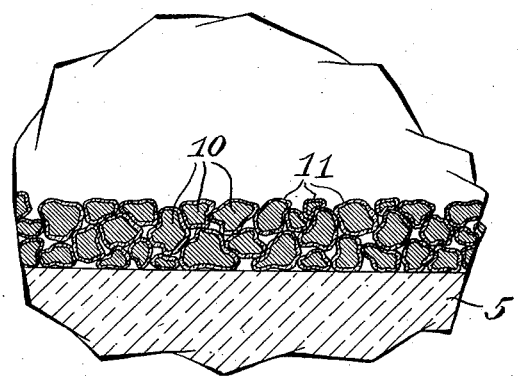
INVENTOR
N. C. BEESE.
BY
ATTORNEY Patented Mar. 21, 1939

2,151,496

UNITED STATES PATENT OFFICE 2,151,496

LUMINESCENT DISCHARGE LAMP AND COATING THEREFOR

Norman C. Beese, Verona, N. J., assignor to Westinghouse Electric & Manufacturing Company, East Pittsburgh, Pa., a corporation of Pennsylvania Application July 22, 1937, Serial No. 155,068

1 Claim. (Cl. 176—122)

The present invention relates to luminescent discharge lamps wherein the interior surface of the envelope is coated with a luminescent material which is excited by the discharge so as to radiate visible light and thus augment the visible light generated by the discharge between the electrodes of the lamp.

Lamps of this type are known to the art, and it is not uncommon to find the characteristic of the coating referred to more or less synonymously as luminescent, fluorescent, or phosphorescent. However, throughout the present specifications and claim the resulting phenomena will be referred to as luminescent, accepting the scientific definition thereof as given by J. A. Radley and Julius Grant on page 4 of their book entitled, "Fluorescence Analysis in Ultra-Violet Light", published in 1933 by D. Van Nostrand & Company.

During operation of lamps of this character, a discharge occurs between the electrodes in a gaseous medium. Inasmuch as the discharge generates invisible radiations lying particularly within the invisible portions of the spectrum, as well as generating visible light, it is known to the art to provide a luminescent coating which is excited by the invisible radiations so that the luminescence of the coating in turn augments the generated visible radiations to increase the luminous efficiency of the discharge device. Various luminescent coating compositions as well as a method of applying the same are equally well known to the art.

However, since mercury vapor is normally employed as the gaseous medium, or its main constituent, inasmuch as a discharge in mercury vapor is rich in ultra-violet, the mercury vapor has an affinity for the coating with the result that an amalgam is formed, or the luminescent material loses its luminescent characteristics within a comparatively short time, thus materially decreasing the efficiency of the lamp.

The present more or less accepted theory of the phenomena of luminescent material is that the crystal structure of such material contains metallic impurities imbedded on the surface of the crystals, which causes the phenomena of luminescence when excited by invisible radiations such as ultra-violet, and in some instances it is believed that these impurities are fused interiorly of the crystals.

The present invention is based upon the theory, which might be said to be more or less confirmed to a certain extent by results obtained, that the molecules of the metallic impurities, such as copper, manganese, or the like, adhere to the surface of the crystals of the luminescent material, which may be zinc silicate, known commercially as synthetic willemite, cadmium tungstate, zinc sulphide, calcium tungstate, or magnesium molybdate. Due to the adhesion of these impurities, strains are created in the crystals of the luminescent material in the form of minute fissures, which, when excited by invisible radiations, cause the vibration of molecules adjacent the fissures, which energy is transformed into visible radiations.

After a comparatively short period of life, the mercury forming part of the gaseous medium amalgamates with the metallic impurities, thus relieving the strains so that vibration of the molecules no longer occurs, resulting in a loss of the luminescent properties of the luminescent material. Moreover, it has been noted that the crystals of the luminescent coating, when applied to the interior surface of the envelope, are so dense that refraction and scattering of the visible radiations generated by the discharge is such that they are absorbed, resulting in a considerable loss in the visible radiations, inasmuch as they are not transmitted through the envelope.

It is accordingly an object of the present invention to provide a discharge device provided with a luminescent coating which is excited by the generated invisible radiations wherein the increments or each crystal particle of the luminescent material is provided with a protective coating transparent to both the ultra-violet and visible radiations, and which is not deleteriously affected by the gaseous medium supporting the discharge between the electrodes of the device.

Another object of the present invention is the provision of a discharge device having a luminescent coating adapted to be excited by the invisible radiations wherein the increments or crystal particles of the luminescent material are each provided with a protective transparent coating, so that the particles of luminescent material are separated a sufficient distance, when applied to the envelope of the discharge device, that substantially all visible light generated by the discharge is reflected or refracted so as to be transmitted through the envelope, thereby increasing the total luminous efficiency of the device.

Another object of the present invention is the provision of a discharge device having a luminescent coating applied to the interior surface of the envelope, which luminescent material is protected from the gaseous medium so as to not be detrimentally affected thereby, wherein a transparent material forms a matrix or enclosing shell for the individual particles of the luminescent material.

Another object of the present invention is the method of increasing the luminescent efficiency of a discharge device by the provision of a luminescent material applied to the interior surface of the envelope, which luminescent material is imbedded in a transparent matrix or surrounding coating allowing the refraction of substantially all visible radiations generated by the discharge and by excitation of the luminescent material.

Still further objects of the present invention will become obvious to those skilled in the art by reference to the following specifications and claims taken in conjunction with the accompanying drawing wherein:

Fig. 1 is a side view of a lamp constructed in accordance with the present invention with a part thereof broken away to better illustrate the construction, and Fig. 2 is a fragmentary view on an enlarged scale of a portion of the tube shown in Fig. 1.

The discharge device normally employed for the generation of light usually consists of a vitreous envelope provided with electrodes therein, between which a discharge occurs when supplied with electrical energy and an ionizable medium, such as mercury, together with a rare gas such as argon, neon, or the like, to facilitate starting. The resulting discharge between the electrodes not only generates visible light, but ionization of the gaseous medium, which is usually mercury vapor alone or in composition with other gases, as before stated, causes the generation of considerable invisible light, such as ultra-violet, in various quantities.

To increase efficiency of a lamp of this type, it is, as hereinbefore stated, well known to provide the interior surface of a lamp with a coating which absorbs the invisible radiations and becomes luminescent, which luminescence is transmitted through the envelope to augment the visible light. The luminescent coating may be applied to the interior surface of the envelope by spraying or flushing. One known method is to suspend the luminescent material in a binder or vehicle, such as cellulose nitrate in amyl acetate or the like, which admixture is either flushed or sprayed in the interior of the envelope. By subsequent heating of the envelope the binder or vehicle is fired off, thus leaving the luminescent material adhering to the envelope surface, as shown and described in the copending application of Albert F. Lindstrom, Serial No. 78,707, filed May 14, 1936, and assigned to the same assignee as the present invention. Since the luminescent material together with the metallic impurities adhering to the surfaces of the crystals are exposed to the ionizable medium, they are readily susceptible to attack. Efficiency curves of such lamps made during normal life show that, while initially the luminous efficiency of the device may range from 55 to a maximum of 60 lumens per watt, such efficiency gradually decreases until after approximately 2,000 hours' operation, the efficiency is decreased to from 25 to 30 lumens per watt. The luminescent material after such period of time is only slightly excitable by invisible radiations and, consequently, becomes luminescent to a much less degree.

It is possible that the loss of luminescence of the luminescent coating is due to the amalgam formed, obviously due to the mercury from the discharge. Consequently it has been found desirable to protect the luminescent material with a substance that is very transparent to the short-wave ultra-violet light, but inactive with respect to mercury vapor. If each individual particle of the luminescent material, such as synthetic willemite or the like, is fused or sintered into a matrix or surrounding coating of transparent material, such as lithium fluoride, borax, or silica, it has been found that not only is the luminous efficiency of the lamp materially increased, but in addition such efficiency lasts for substantially the entire life of the lamp.

Also the protective layer, or matrix, as I shall hereinafter term it, for the fluorescent material has a comparatively high refractive index, (compared to vacuum=1) which materially assists in increasing the visible radiations generated by the discharge and transmitted through the luminescent coating. This result undoubedly contributes to the increased efficiency of the lamp, inasmuch as each individual crystal of the luminescent material is accordingly separated by the transparent matrix, which increases the refractive character of the luminescent material, whereas in luminescent coatings at present known to the art, the luminescence generated at the inner surface of the luminescent coating is reflected, scattered, or absorbed to an appreciable degree.

By reference to the drawing a tube 5 is shown in Fig. 1 which is provided with oppositely disposed electrodes 6 and 7. After exhaustion through an exhaust stem 8, the envelope is filled with an inert gas to facilitate starting, as before mentioned, and a small quantity of a vaporizable material such as mercury 9 is disposed interiorly of the envelope. Prior to fabrication of the complete lamp the envelope is provided with a coating of luminescent material 10 such as by the method shown and described in the above mentioned copending application. However, the coating 10 differs materially from that shown in such copending application in that the individual particles of luminescent material 10 are each surrounded by a protective layer or matrix of transparent material 11 such as silica, lithium fluoride, ethyl silicate, or the like as shown in Fig. 2.

A mechanical or physical method of coating the luminescent material with a transparent matrix such as silica, borax, lithium fluoride, ethyl silicate, or the like 11 may be employed. However, inasmuch as a mechanical or physical method is somewhat expensive, a chemical method is preferred. Accordingly, zinc silicate ($ZnO.SiO_2;Mn$), commercially known as synthetic willemite, is first ground or pulverized and covered with ethyl silicate to which a small quantity of ethyl alcohol may be added. The solution or admixture thus formed may be stirred periodically until the solution is evaporated to dryness at a temperature slightly above room temperature. After initial evaporation the admixture may be further dried by placing in a drying oven for several days.

Tests have indicated that the grinding of the willemite and the addition of the ethyl silicate or the like, causes the formation of a transparent coating or matrix 11 around the individual particles of the luminescent material 10. After thorough drying of the admixture to form the precoated crystals or particles, the same may be suspended in a suitable medium or vehicle such as cellulose acetate or nitrocellulose. After suspension of the luminescent admixture in the vehicle or medium, it is thoroughly mixed so that the particles or increments of the luminescent material enclosed in their transparent matrix are entirely disbursed. The material in suspension with the vehicle is then flushed or sprayed into the envelope.

Following application of the spraying or flushing step, the envelope may be air dried for approximately fifteen minutes to allow for evaporation of the solvent and the envelope first subjected to a preliminary heating for about five minutes at approximately 270° C. to completely remove all traces of the solvent. At the same time such preliminary heating volatilizes to a slight degree the suspending medium of nitrocellulose or the like.

Inasmuch as impurities necessarily remain in the coating in the form of carbonaceous deposits after the period of preliminary heating, the envelope may be next heated for a period of approximately fifteen minutes to an hour at a temperature of 450° C., depending upon the number of envelopes commercially manufactured in any one lot. This final heating of the coated envelope completely burns or fires off the remaining vehicle as well as all traces of carbonaceous deposits, so that the same in no way affects the quality of the completed lamp.

The resulting coating formed thus firmly adheres to the interior surface of the envelope, and the individual crystals of the luminescent material are each enclosed in a transparent matrix. Upon the excitation of the luminescent material by the invisible radiations generated by the discharge, a path of transparent material is formed where the visible radiations both from the luminescent material and the discharge may be refracted so as to be transmitted by the envelope substantially in their entirety.

Moreover, the transparent matrix being of a material not deleteriously affected by the mercury, prevents the destruction of the luminescent characteristic of the luminescent material, which, in cooperation with the refractive characteristics of the matrix, not only increases the efficiency of the lamp, but results in the maintenance of such efficiency for substantially the entire life of the device.

It thus becomes obvious to those skilled in the art that I have provided a discharge device having a luminescent coating wherein the individual crystals of the luminescent material are each enclosed in a transparent matrix. This matrix separates the particles of the luminescent material so that substantially all visible radiations generated are refracted or reflected to increase the efficiency of the lamp, resulting in efficiencies as high as 68.5 lumens per watt. Also, since such matrix is of a material not deleteriously affected by the ionizable medium, no amalgam with the luminescent material is formed, so that the efficiency of the device remains substantially constant throughout normal life.

Although I have shown and described one specific embodiment of my present invention, I do not desire to be limited thereto, as various other modification thereof may be made without departing from the spirit and scope of the appended claim.

I claim:

The method of forming a luminescent coating for an electric discharge lamp to increase the efficiency and longevity of the lamp which consists in pulverizing a material excitable by ultraviolet radiations, mixing with the luminescent material a substance which is adsorbed thereby and forms a transparent matrix for each individual particle of luminescent material, suspending the admixture in a vehicle, applying the admixture to the interior surface of the envelope of the lamp, and firing off the vehicle to leave a uniform residue of protected particles of luminescent material.

NORMAN C. BEESE.